United States Patent Office 3,551,180
Patented Dec. 29, 1970

3,551,180
AQUEOUS BINDER WITH ADHERENCE ADDITIVE FOR LAMP PHOSPHOR COATING
Joseph M. Margolis, South Euclid, Ohio, assignor to General Electric Company, a corporation of New York
No Drawing. Filed Dec. 9, 1968, Ser. No. 782,488
Int. Cl. H01k 1/32
U.S. Cl. 117—33.5        5 Claims

ABSTRACT OF THE DISCLOSURE

In fluorescent lamp manufacture, the use of calcium halophosphate phosphors having a more uniform particle shape and size distribtuion has improved lamp efficiency but has aggravated the condition of poor coating adherence. Most known adherence additives cause a decrease in lamp efficiency, particularly when used in aqueous phosphor suspensions. The addition of $BaHPO_4 \cdot 4.5H_3PO_4$ in amounts of 0.01–0.03% based on the weight of phosphor present to an ammoniacal carboxymethylcellulose suspension achieves improved adherence with negligible reduction in lamp efficiency.

CROSS-REFERENCES TO RELATED APPLICATIONS

Copending application Ser. No. 542,582, filed Apr. 14, 1966, now U.S. Pat. No. 3,424,605, by David H. Beaumont and Arnold I. Friedman, entitled "Lamp Phosphor Adherence" and similarly assigned, discloses the use of barium nitrate for improving the bonding of halophosphate phosphors to the glass envelope in a fluorescent lamp.

The invention relates to the phosphor coatings within the envelopes of fluorescent lamps and particularly to a process and phosphor suspension for improving the adherence of the coatings without deleteriously affecting light output and maintenance.

In fluorescent lamp manufacture, phosphor coatings are normally provided by flushing the lamp with a suspension of phosphor particles, drying the suspension and then lehring the lamp envelope or tube. The suspension may have either an aqueous or an organic solvent and includes a temporary binder. The initial drying step is for the purpose of removing gross amounts of water or organic solvents. This leaves a phosphor film adhered to the inside of the glass tube by means of the temporary binder. Lehring removes any remaining water or organic solvents and burns out the temporary binder.

Due to the tendency of the phosphor coating to chip or flake off the inside of the tube and leave bare spots during lamp making or use, various additives for improving the adherence of the phosphor coating to the glass have been proposed. To be useful in a fluorescent lamp, an adherence additive must not react deleteriously with the lamp environment and must not absorb ultraviolet or visible radiation unproductively. In copending application Ser. No. 542,582, filed Apr. 14, 1966, now U.S. Pat. No. 3,424,605, by David H. Beaumont and Arnold I. Friedman, entitled "Lamp Phosphor Adherence" and similarly assigned, the addition of barium nitrate $Ba(NO_3)_2$ to the aqueous suspension of phosphor as an adherence promoter upon lehring of the lamp is disclosed. The disclosure of that application is hereby incorporated herein by reference.

The preferred temporary binder or organic adherence additive is carboxymethylcellulose (CMC). Acid carboxymethyl cellulose is used as a starting material and may be treated with ammonium hydroxide to make it substantially neutral or strongly basic. The neutral or slightly acid (CMC) suspension is subject to deterioration by bacterial attack after periods of storage. This seems to be caused by common air-borne or soil-inhabiting bacteria which digest the cellulosics present in the carboxymethylcellulose of the suspension. After some time, strong odors develop which make the material very unpleasant to work with. Bacterial growth may decrease the viscosity of the neutral suspension to such an extent that it is no longer usable after a continuous coating run of several hours. While the addition of bactericides will reduce the rate of bacterial attack in neutral CMC, deterioration still takes place.

Because neutral CMC is subject to bacterial attack, it is preferred to use ammoniacal CMC. When barium nitrate $Ba(NO_3)_2$ is used as an adherence promoter in a phosphor suspension in ammoniacal CMC, the suspension tends to degrade over extended periods of time with exposure to air containing carbon dioxide. Phosphor coatings are normally produced in fluorescent lamp tubes by either of two general methods, downflushing and upflushing. In downflushing the phosphor suspension is flushed downwardly through the tube maintained in a vertical position. In upflushing, the suspension is drawn or forced upward through the tube and then allowed to drain back. In either process, considerable excess suspension is used and such excess is recycled. However downflushing normally involves aerating the suspension to a greater extent than does upflushing due to the way in which the suspension is introduced into the empty tube from above. Degradation and loss of adherence promoting ability of CMC phosphor suspensions containing $Ba(NO_3)_2$ is particularly rapid in downflush coating. The degradation seems to take place by conversion of $Ba(NO_3)_2$ to $BaCO_3$ through absorption of carbon dioxide from the atmosphere. The $BaCO_3$ does not lead to the adherence improvements obtained with $Ba(NO_3)_2$.

SUMMARY OF THE INVENTION

The object of the invention is to provide a new and improved process and phosphor suspension for phosphor coating fluorescent lamp envelopes utilizing aqueous suspensions of phosphors not subject to degradation upon exposure to air.

In accordance with the invention, I have found that by adding a soluble material of composition $BaHPO_4 \cdot xH_3PO_4$ where $x$ falls between 4 and 5, in amounts from 0.01 to 0.03% based on the weight of phosphor to a water soluble binder such as an ammoniacal carboxymethylcellulose solution, improved adherence is achieved with negligible loss of lamp efficiency.

DETAILED DESCRIPTION

By way of example of the use of the invention in fluorescent lamp manufacture, halophosphate phosphors for use in lamps, such as calcium halophosphate phosphor activated with antimony and manganese, may be produced by methods known in the prior art. After firing, the phosphors are milled to disperse agglomerates and then washed to remove deleterious impurities. Milling can be done in an aqueous suspension using a suspending medium such as polyvinylmethacrylate/maleic anhydride copolymer and washing can be done with ammoniated ethylenediamine tetraacetic acid (EDTA) according to Pat. 3,047,-512, Martyny. Alternatively, washing may be done with sulfamic acid $NH_2SO_3H$ as taught in patent application Ser. No. 441,317, filed Mar. 19, 1965, now U.S. Pat. No. 3,384,598, by Arnold I. Friedman and David H. Beaumont and similarly assigned.

To prepare the suspension, a suitable water-soluble polymer such as ammoniacal carboxymethylcellulose in approximately a 2% solution in water is added to the clean phosphor to a level from 0.4 to 0.6%, preferably about 0.5%, carboxymethylcellulose by weight based on the dry phosphor content. The barium hydrogen acid phosphate was then prepared by dissolving two grams $BaHPO_4$ in from 4 to 5 grams of warm $H_3PO_4$ at 85% concentration. The preferred formulation is $BaHPO_4 \cdot 4.5H_3PO_4$ for which 4.5 grams of $H_3PO_4$ are used. This was then diluted to 100 cc. with water and the proper amount measured out for mixing with the lamp coating suspension to provide from 0.01 to 0.03% by weight of $BaHPO \cdot 4.5H_3PO_4$ based on the weight of dry phosphor in the suspension, 0.02% being preferred. Other known water-soluble polya portion of the phosphor layer to flake off about the point mers may be used for the binder, for instance polyvinylmethylether/maleic anhydride copolymer (PVM/MA). A mix of equal parts by weight CMC and PVM/MA is very good.

The mixture is thoroughly homogenized by a high-speed mixer to assure absence of lumps. A glass tube may then be coated by flowing the suspension over the tube surface, for instance by downflushing as previously described. After drying, the coated tubes are lehred at a temperature and for a time sufficient to decompose the binder and effectuate bonding of the phosphor particles to the glass. A temperature of 625° C. to 650° C. for a few minutes is sufficient. The phosphor-coated tubes are then ready to be made into fluorescent lamps.

Tables 1 and 2 below show the effects of the barium hydrogen acid phosphate additive on phosphor adherence and on lamp efficiency using the above preferred formulation, by comparison with control lamps made by using the same formulation but without the additive. In a typical snap test, the bulb wall is resiliently impacted causing a portion of the phosphor layer to flake off about the point of impact. Comparisons of the major dimension of the bare spot indicate the tenacity of phosphor adherence.

It will be noted that by the use of the barium hydrogen acid phosphate additive of the invention, the diameter of the coating off is reduced five to six-fold. There is no significant effect on lamp efficiency or maintenance.

The barium hydrogen acid phosphate adherence additive also gives good results with carboxymethylcellulose (CMC) suspensions admixed with other water-soluble polymers such as polyvinylmethylether/maleic anhydride copolymer (PVM/MA), as shown by the following data in which equal parts by weight of CMC and PVM/MA were used in the binder.

TABLE 3

| Lamp test | Coating off by snap test, mm. | Lamp efficiency | | | | | |
|---|---|---|---|---|---|---|---|
| | | 0 hr. | | 100 hr. | | 500 hr. | |
| | | L | LPW | L | LPW | L | LPW |
| Control | 156 | 3,353 | 80.5 | 3,296 | 80.0 | 3,263 | 79.4 |
| 0.02% ($BaHPO_4 \cdot 4.5H_3PO_4$) | 18 | 3,347 | 80.8 | 3,282 | 79.9 | 3,230 | 78.8 |

The barium hydrogen acid phosphate additive of the invention is unique in its effectiveness with aqueous binders. It has heretofore been suggested to use barium tetraphosphate $3BaO \cdot 2P_2O_5$ as an adherence promoter in organic solvent suspensions. This material is not soluble in water. It may be added as a solid to organic solvent suspensions but must be dispersed by milling or vigorous mixing, and it always remains as discrete particles. By contrast, the barium hydrogen acid phosphate according to my invention is added as a dissolved salt and, upon mixing, is dispersed molecularly throughout the water-solvent phosphor suspension. This makes for a much more widely and evenly dispersed adherence agent than can be achieved with barium tetraphosphate.

The barium hydrogen acid phosphate additive did not cause a breakdown of the bulb coating suspension on long standing. Two test results given below show this. In the first test, Table 4, the suspension stood for 7 days after initial use. In the second test, Table 5, it stood for 17 days after initial use.

TABLE 4

| Standing time | Variation | Coating off by snap test, mm. | Lamp efficiency | | | | | |
|---|---|---|---|---|---|---|---|---|
| | | | 0 hr. | | 100 hr. | | 500 hr. | |
| | | | L | LPW | L | LPW | L | LPW |
| Initial | Control | 260 | 3,319 | 77.4 | 3,237 | 77.2 | 3,184 | 76.2 |
| | 0.02% ($BaHPO_4 \cdot 4.5H_3PO_4$) | 46 | 3,357 | 78.0 | 3,265 | 77.7 | 3,168 | 75.8 |
| 7 days | Control | 225 | 3,326 | 77.6 | 3,251 | 77.0 | 3,183 | 76.1 |
| | 0.02% ($BaHPO_4 \cdot 4.5H_3PO_4$) | 37 | 3,344 | 78.3 | 3,236 | 77.1 | 3,173 | 75.7 |

TABLE 1

| Lamp test | Coating off by snap test, mm. | Lamp efficiency | | | | | |
|---|---|---|---|---|---|---|---|
| | | 0 hr. | | 100 hr. | | 500 hr. | |
| | | L | LPW | L | LPW | L | LPW |
| Control | 300 | 3,359 | 79.0 | 3,296 | 78.5 | 3,245 | 76.4 |
| 0.02% ($BaHPO_4 \cdot 4.5H_3PO_4$) | 50 | 3,359 | 79.5 | 3,254 | 78.3 | 3,218 | 77.1 |

The averaged results of five additional tests showed:

TABLE 2

| Lamp test | Coating off by snap test, mm. | Lamp efficiency | | | | | |
|---|---|---|---|---|---|---|---|
| | | 0 hr. | | 100 hr. | | 500 hr. | |
| | | L | LPW | L | LPW | L | LPW |
| Control | 236 | 3,354 | 78.5 | 3,285 | 78.3 | 3,220 | 77.0 |
| 0.02% ($BaHPO_4 \cdot 4.5H_3PO_4$) | 49 | 3,371 | 79.1 | 3,279 | 77.0 | 3,200 | 76.6 |

TABLE 5

| Standing time | Variation | Coating off by snap test, mm. | 0 hr. L | 0 hr. LPW | 100 hr. L | 100 hr. LPW | 500 hr. L | 500 hr. LPW |
|---|---|---|---|---|---|---|---|---|
| Initial | Control | 55 | 3,333 | 80.3 | 3,307 | 80.3 | 3,242 | 78.9 |
|  | 0.02%($BaHPO_4 \cdot 4.5H_3PO_4$) | 16 | 3,340 | 80.8 | 3,287 | 80.2 | 3,225 | 78.6 |
| 17 days | Control | 156 | 3,353 | 80.5 | 3,296 | 80.0 | 3,263 | 79.4 |
|  | 0.02%($BaHPO_4 \cdot 4.5H_3PO_4$) | 19 | 3,347 | 80.8 | 3,282 | 79.9 | 3,230 | 78.8 |

In both of these tests the adherence remained undiminished over the time interval. Lamp efficiency likewise was not affected.

The $BaHPO_4 \cdot 4.5H_3PO_4$ additive is water soluble and the amount that need be added is quite small, generally from 0.01 to 0.03% by weight based on the phosphor weight in the suspension. Amounts less than 0.01% do not cause appreciable improvement in phosphor adherence. Amounts exceeding 0.03% give further improvements in adherence but then lamp efficiency begins to drop. I have found the percentage of 0.02% by weight to be preferable.

What I claim as new and desire to secure by Letters Patent of the United States is:

1. A method of coating a fluorescent lamp tube comprising making an aqueous suspension of phosphor particles containing, by weight based on the amount of dry phosphor, 0.01 to 0.03% $BaHPO_4 \cdot xH_3PO_4$ where $x$ is between 4 and 5 in a temporary binder mix of a water soluble polymer, flowing said suspension over the tube surface, drying the coated tube, and then lehring the tube at a temperature and for a time sufficient to decompose the temporary binder and effectuate bonding of the phosphor particle to the glass.

2. The method of claim 1 wherein $x$ is approximately 4.5.

3. The method of claim 1 wherein the proportion of $BaHPO_4 \cdot xH_3PO_4$ is about 0.02% and $x$ is approximately 4.5.

4. The method of claim 1 wherein the water soluble polymer comprises carboxymethylcellulose.

5. The method of claim 3 wherein the phosphor is calcium halophosphate and the water soluble polymer comprises carboxymethylcellulose.

References Cited
UNITED STATES PATENTS 2,987,414 6/1961 Martyny.
3,059,133 10/1962 Wanmaker et al.
3,310,418 3/1967 Friedman et al.

ALFRED L. LEAVITT, Primary Examiner

W. F. CYRON, Assistant Examiner